(12) United States Patent
Morozumi (10) Patent No.: US 8,505,602 B2
(45) Date of Patent: Aug. 13, 2013

(54) PNEUMATIC TIRE

(75) Inventor: Junichiro Morozumi, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 347 days.

(21) Appl. No.: 12/832,710

(22) Filed: Jul. 8, 2010

(65) Prior Publication Data

US 2011/0011508 A1 Jan. 20, 2011

(30) Foreign Application Priority Data

Jul. 17, 2009 (JP) ................................. 2009-168950

(51) Int. Cl.
*B60C 15/00* (2006.01)
*B60C 15/06* (2006.01)

(52) U.S. Cl.
USPC ............ 152/539; 152/543; 152/544; 152/555

(58) Field of Classification Search
USPC ........................................................ 152/543
See application file for complete search history.

(56) References Cited

U.S. PATENT DOCUMENTS

| 1,915,963 | A | * | 6/1933 | Wait .............................. | 156/135 |
| 3,861,438 | A | * | 1/1975 | Bertelli et al. ................ | 152/520 |
| 7,552,751 | B2 | * | 6/2009 | Miyazaki ...................... | 152/165 |
| 2003/0209302 | A1 | | 11/2003 | Hanya | |
| 2007/0029021 | A1 | | 2/2007 | Miyazaki | |

FOREIGN PATENT DOCUMENTS

| JP | 10-138718 | * | 5/1998 |
| JP | 2006-168499 A | | 6/2006 |
| JP | 2007-38917 A | | 2/2007 |

OTHER PUBLICATIONS

Machine translation of JP 10-138718, 1998.*
Office Action for corresponding Japanese Application No. 2009-168950 dated May 24, 2011.

* cited by examiner

*Primary Examiner* — Justin Fischer
(74) *Attorney, Agent, or Firm* — Birch, Stewart, Kolasch & Birch, LLP (57) ABSTRACT

A tire includes a rim protector (20) positioned on an outside in an axial direction of a sidewall. The rim protector (20) includes a main portion (34), an outer portion (36) and an inner portion (38). The main portion (34) has a large number of blocks (44). The blocks (44) are arranged in a circumferential direction. The main portion (34) further has a first slit (46), a second slit (48) and a large number of third slits (50). The first slit (46) is extended in the circumferential direction. The second slit (48) is extended in the circumferential direction. Each of the third slits (50) is extended in a radial direction. The third slit (50) reaches the second slit (48) from the first slit (46). Each of the blocks (44) is surrounded by the first slit (46), the second slit (48) and two of the third slits (50).

2 Claims, 10 Drawing Sheets

PNEUMATIC TIRE

This application claims priority on Patent Application No. 2009-168950 filed in JAPAN on Jul. 17, 2009, the entire contents of which are hereby incorporated by reference.

BACKGROUND OF THE INVENTION

1. Field of the Invention

The present invention relates to a pneumatic tire. In detail, the present invention relates to a tire including a rim protector.

2. Description of the Related Art

A tire is used in an attachment to a rim. The rim includes a flange. A curbstone is provided between a roadway and a footpath over a road having the footpath. In some cases, the rim flange comes in contact with the curbstone when a vehicle is caused to approach a shoulder of the road. Due to the contact, the rim might be damaged. Some roads have a chatter bar provided on road surfaces. In some cases in which the tire gets over the chatter bar, the tire is excessively deformed so that the rim flange collides with the chatter bar. Due to the collision, the rim might be damaged. In a tire having a low aspect ratio, a distance between the road surface and the rim flange is short. In a rim to which a tire having a low aspect ratio is attached, the flange and the curbstone are apt to come in contact with each other. In the rim to which the tire having the low aspect ratio is attached, the flange and the chatter bar are apt to collide with each other.

US2003/209302 (JP2003-326921) has disclosed a tire including a rim protector. The rim protector is protruded outward in an axial direction from a sidewall. When a vehicle is caused to approach a shoulder of a road, the rim protector comes in contact with a curbstone prior to a rim flange. When the tire is to get over a chatter bar, the rim protector is provided between the chatter bar and the rim flange. The rim protector prevents the rim flange from being damaged.

The tire including the rim protector has a heavy weight. The tire deteriorates a low fuel consumption performance of the vehicle. The rim protector causes an excessively vertical stiffness of the tire. The tire has a poor ride comfort. The rim protector impedes a heat radiation of the tire.

It is an object of the present invention to provide a pneumatic tire having a small weight and capable of preventing a rim flange from being damaged.

SUMMARY OF THE INVENTION

A pneumatic tire according to the present invention includes a tread having an external surface forming a tread surface, a pair of sidewalls extended almost inward in a radial direction from an end of the tread respectively, a pair of beads positioned on an almost inside in the radial direction with respect to the sidewalls respectively, a carcass laid between one of the beads and the other bead along an inside of the tread and the sidewall, and a rim protector positioned on an outside in an axial direction of the sidewall. The rim protector has a large number of blocks arranged in a circumferential direction.

In the pneumatic tire according to the present invention, the rim protector prevents a rim flange from being damaged. The rim protector has a small weight. The tire can contribute to a low fuel consumption performance of a vehicle.

It is preferable that the rim protector should have a first slit and a second slit which are extended in the circumferential direction, and a large number of third slits extended in the radial direction. Each of the blocks is surrounded by the first slit, the second slit and two of the third slits.

It is preferable that a height of the block should be greater than a width of the first slit, be greater than a width of the second slit and be greater than a width of the third slit. It is preferable that the width of the third slit should be greater than the width of the first slit and be greater than the width of the second slit.

The rim protector can have a main portion, an outer portion extended outward in the radial direction from the main portion, and an inner portion extended inward in the radial direction from the main portion. It is preferable that the large number of blocks should be formed in the main portion.

It is preferable that the outer portion should have a large number of slits and a large number of plates. The slits and the plates are disposed alternately in the circumferential direction.

It is preferable that the inner portion should have a large number of slits and a large number of plates. The slits and the plates are disposed alternately in the circumferential direction.

DESCRIPTION OF THE PREFERRED EMBODIMENTS

The present invention will be described below in detail based on preferred embodiments with reference to the drawings.

Figure 1:
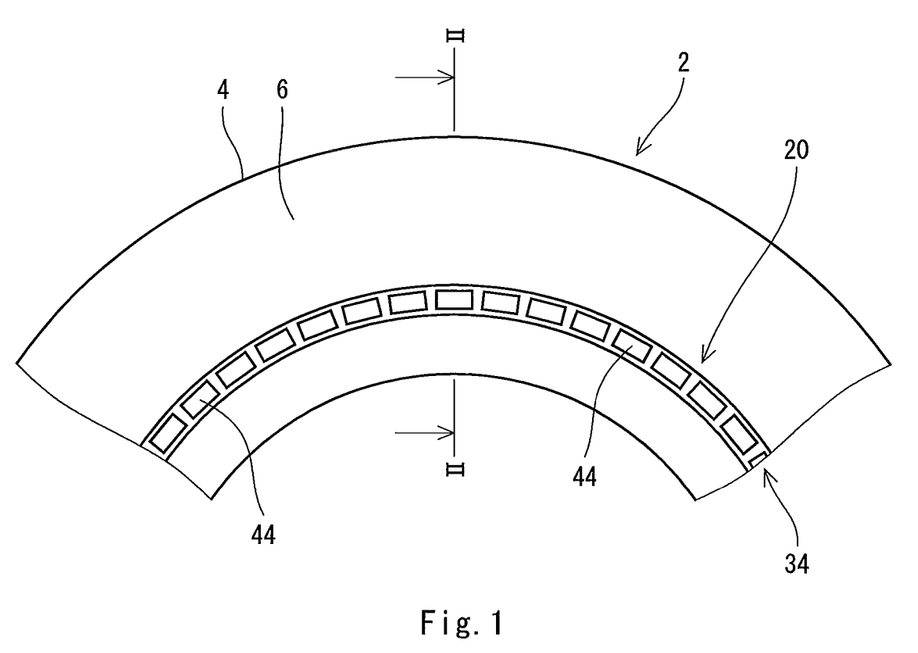
FIG. 1 is a front view showing a part of a pneumatic tire according to an embodiment of the present invention.
Figure 2:
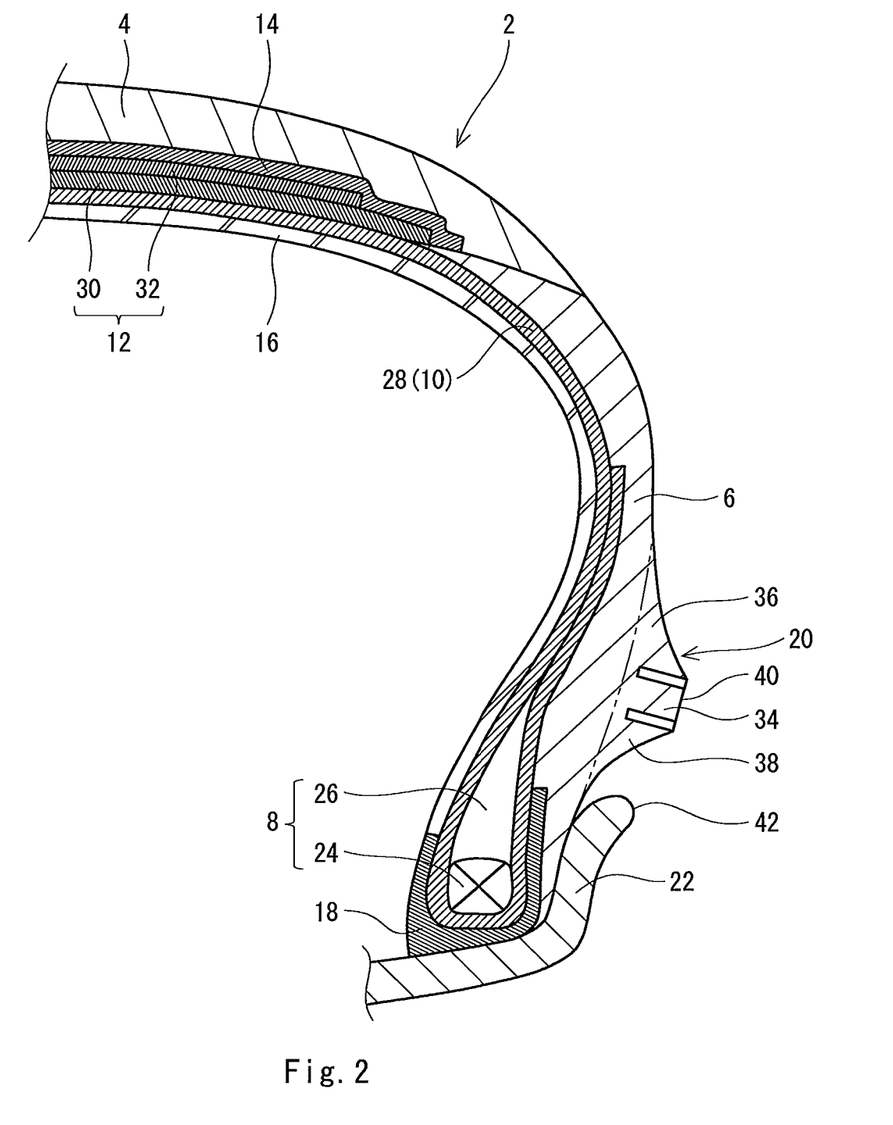
FIG. 2 is an enlarged sectional view taken along a II-II line in FIG. 1.

A tire 2 shown in FIGS. 1 and 2 includes a tread 4, a sidewall 6, a bead 8, a carcass 10, a belt 12, a band 14, an inner liner 16, a chafer 18 and a rim protector 20. The tire 2 is of a tubeless type. FIG. 2 also shows a flange 22 of a rim to which the tire 2 is to be attached.

The tread 4 is constituted by a crosslinked rubber which is excellent in an abrasion resistance. The tread 4 takes an outward convex shape in a radial direction. The tread 4 includes a tread surface. The tread surface comes in contact with a road surface.

The sidewall 6 is extended almost inward in the radial direction from an end of the tread 4. The sidewall 6 is constituted by a crosslinked rubber. The sidewall 6 absorbs a shock from the road surface by a flexure. Furthermore, the sidewall 6 prevents an external damage of the carcass 10.

The bead 8 is positioned on an almost inside in the radial direction with respect to the sidewall 6. The bead 8 includes a core 24 and an apex 26 extended outward in the radial direction from the core 24. The core 24 is ring-shaped. The core 24 is obtained by winding a non-extensible wire. Typically, a wire formed by steel is used for the core 24. The apex 26 is tapered outward in the radial direction. The apex 26 is constituted by a crosslinked rubber having a high hardness.

The carcass 10 is formed by a carcass ply 28. The carcass ply 28 is laid between the beads 8 on both sides and is provided along an inside of the tread 4 and the sidewall 6. The carcass ply 28 is folded back from an inside toward an outside in an axial direction around the core 24. The carcass ply 28 is constituted by a large number of cords provided in parallel and a topping rubber, which is not shown. An absolute value of an angle formed by each of the cords with respect to an equator plane is usually 70° to 90°. In other words, the carcass 10 has a radial structure.

The belt 12 is positioned on an outside in the radial direction of the carcass 10. The belt 12 is provided on the carcass 10. The belt 12 reinforces the carcass 10. The belt 12 is formed by an inner layer 30 and an outer layer 32. Each of the inner layer 30 and the outer layer 32 is formed by a large number of cords which are provided in parallel and a topping rubber, which is not shown. Each of the cords is tilted with respect to the equator plane. An absolute value of a tilt angle is equal to or greater than 10° and is equal to or smaller than 35°. A tilt direction of the cord of the inner layer 30 is reverse to a tilt direction of the cord of the outer layer 32.

The band 14 covers the belt 12. The band 14 is constituted by a cord and a topping rubber, which is not shown. The cord is substantially extended in a circumferential direction and is wound spirally. The band 14 has a so-called jointless structure. The belt 12 is restrained by the cord. Therefore, lifting of the belt 12 is suppressed.

The rim protector 20 is positioned on an outside in the axial direction of the sidewall 6. The rim protector 20 is integrated with the sidewall 6. The rim protector 20 has a main portion 34, an outer portion 36 and an inner portion 38. The outer portion 36 is extended outward in the radial direction from the main portion 34. The inner portion 38 is extended inward in the radial direction from the main portion 34. An end face 40 of the main portion 34 is positioned on an outside of an end 42 of the rim flange 22 in the axial direction.

When a driver turns a steering wheel of a vehicle so that the vehicle is caused to approach a shoulder of a road, the rim protector 20 comes in contact with a curbstone. Due to the contact, a reaction force is generated over the steering wheel. By the reaction force, the driver detects the contact of the curbstone and the tire 2. When the driver turns the steering wheel reversely, the contact of the rim flange 22 and the curbstone can be avoided. The rim protector 20 prevents the rim flange 22 from being damaged.

When the tire 2 gets over a chatter bar, the rim protector 20 is disposed between the chatter bar and the rim flange 22 even if the tire 2 is deformed considerably. By the rim protector 20, the rim flange 22 and the chatter bar can be prevented from colliding with each other. The rim protector 20 prevents the rim flange 22 from being damaged.

Figure 3:
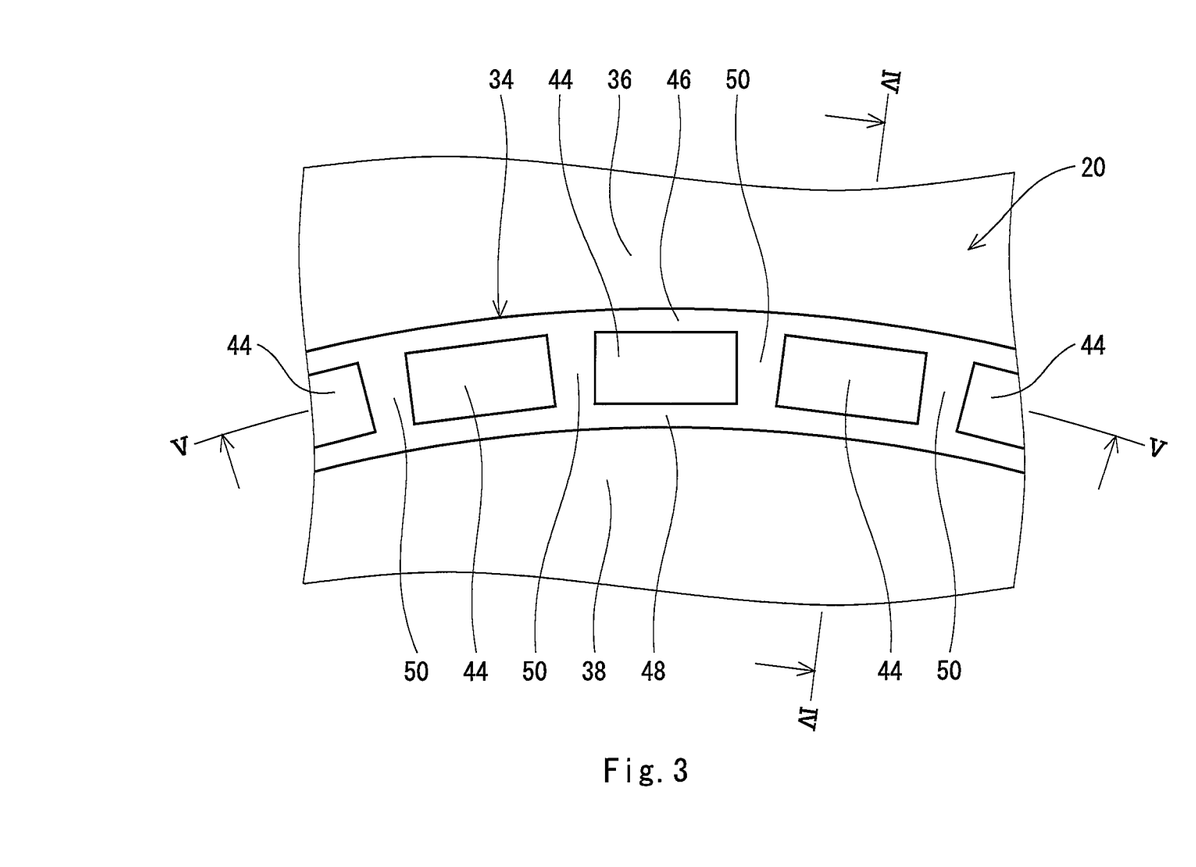
FIG. 3 is an enlarged front view showing a part of the tire in FIG. 1.

As shown in FIG. 3, the main portion 34 includes a large number of blocks 44. The blocks 44 are arranged in the circumferential direction. As is apparent from FIGS. 4 and 5, each of the blocks 44 generally takes a prismatic shape. The block 44 is a rectangle as seen from a front part.

The main portion 34 further includes a first slit 46, a second slit 48 and a large number of third slits 50. The first slit 46 is extended in the circumferential direction. As seen from a front part, the first slit 46 takes a circular shape. The second slit 48 is extended in the circumferential direction. As seen from a front part, the second slit 48 takes a circular shape. The circles of the first slit 46 and the second slit 48 are concentric with each other. A radius of the circle of the first slit 46 is greater than that of the circle of the second slit 48. Each of the third slits 50 is extended in the radial direction. The third slit 50 reaches the second slit 48 from the first slit 46. Each of the blocks 44 is surrounded by the first slit 46, the second slit 48 and two of the third slits 50.

Since the rim protector 20 includes a large number of slits 46, 48 and 50, it has a smaller weight than the conventional rim protector. A function for protecting the rim flange 22 can be prevented from being inhibited by the slits 46, 48 and 50. The tire 2 can contribute to a low fuel consumption of a vehicle and can prevent the rim flange 22 from being damaged.

In the rim protector 20, a rubber lump is separated by the large number of slits 46, 48 and 50. Accordingly, an influence of the rim protector 20 on the vertical stiffness of the tire 2 is smaller than that of the conventional rim protector. The tire 2 is excellent in a ride comfort.

The rim protector 20 has the slits 46, 48 and 50. Therefore, the rim protector 20 has a large surface area. Because of the large surface area, a heat radiation from the tire 2 to an atmosphere is promoted. In the tire 2, a rubber member is broken due to heat with difficulty. In the tire 2, peeling of the rubber member from another rubber member is caused by the heat with difficulty. The tire 2 is excellent in a durability. The rim protector 20 having the slit exhibits a particularly remarkable effect in a run flat tire.

The block 44 is formed in the main portion 34. Therefore, the block 44 can be visually recognized as seen from a front part. The large number of blocks 44 are arranged so that a beauty of the tire 2 can be enhanced.

Figure 4:
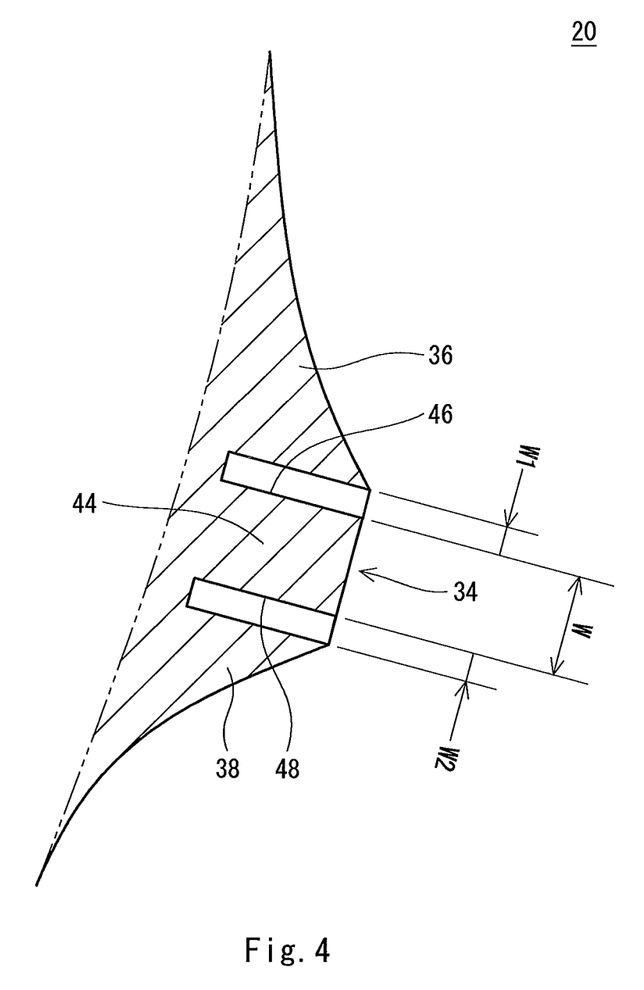
FIG. 4 is an enlarged sectional view taken along a IV-IV line in FIG. 3.

In FIG. 4, an arrow W indicates a width of the block 44, an arrow W1 indicates a width of the first slit 46, and an arrow W2 indicates a width of the second slit 48. It is preferable that the width W1 should be equal to or greater than 0.5 mm and be equal to or smaller than 3.0 mm. The tire 2 including the first slit 46 having the width W1 which is equal to or greater than 0.5 mm has a small weight and is excellent in the ride comfort. From this viewpoint, it is particularly preferable that the width W1 should be equal to or greater than 1.0 mm. The rim protector 20 including the first slit 46 having the width W1 which is equal to or smaller than 3.0 mm is excellent in a strength. From this viewpoint, it is particularly preferable that the width W1 should be equal to or smaller than 2.0 mm. It is preferable that the width W2 should be equal to or greater than 0.5 mm and be equal to or smaller than 3.0 mm. The tire 2 including the second slit 48 having the width W2 which is equal to or greater than 0.5 mm has a small weight and is excellent in the ride comfort. From this viewpoint, it is particularly preferable that the width W2 should be equal to or greater than 1.0 mm. The rim protector 20 including the second slit 48 having the width W2 which is equal to or smaller than 3.0 mm is excellent in the strength. From this viewpoint, it is particularly preferable that the width W2 should be equal to or smaller than 2.0 mm. The width W is determined to achieve the proper widths W1 and W2. It is preferable that the width W should be equal to or greater than 1.0 mm and be equal to or smaller than 10.0 mm.

Figure 5:
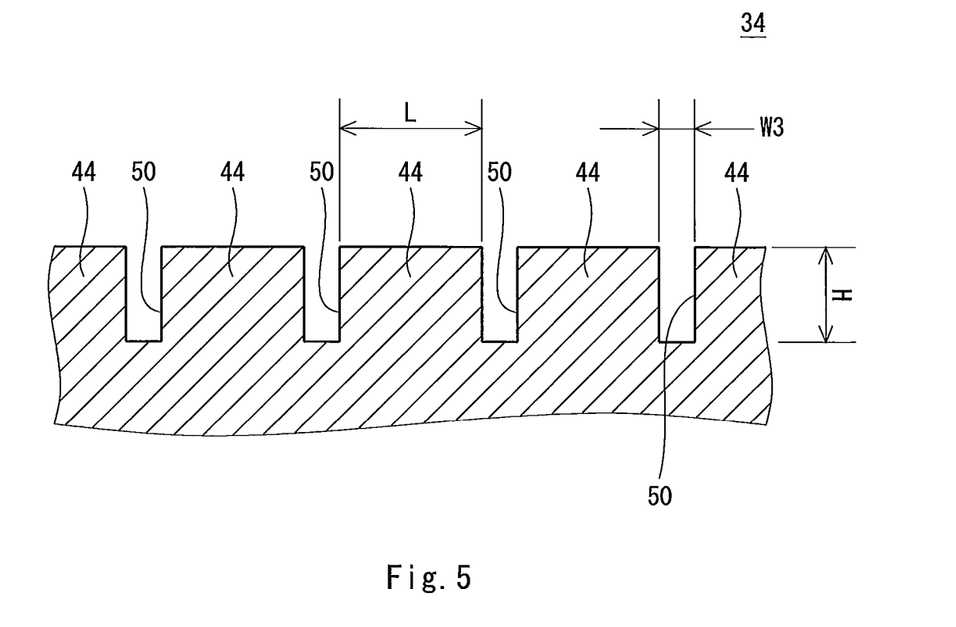
FIG. 5 is an enlarged sectional view taken along a V-V line in FIG. 3.

In FIG. 5, an arrow L indicates a length of the block 44. It is preferable that the length L should be equal to or greater than 2 mm and be equal to or smaller than 50 mm. The rim protector 20 including the block 44 having the length L which is equal to or greater than 2 mm is excellent in the strength. From this viewpoint, it is particularly preferable that the length L should be equal to or greater than 6 mm. The tire 2 including the block 44 having the length L which is equal to or smaller than 50 mm has a small weight and is excellent in the ride comfort. From this viewpoint, it is more preferable that the length L should be equal to or smaller than 30 mm and it is particularly preferable that the length L should be equal to or smaller than 20 mm.

In FIG. 5, an arrow H indicates a height of the block 44. It is preferable that the height H should be equal to or greater than 2 mm and be equal to or smaller than 20 mm. The tire 2 including the block 44 having the height H which is equal to or greater than 2 mm has a small weight and is excellent in the ride comfort. From this viewpoint, it is particularly preferable that the height H should be equal to or greater than 5 mm. The rim protector 20 including the block 44 having the height H which is equal to or smaller than 20 mm is excellent in the strength. From this viewpoint, it is particularly preferable that the height H should be equal to or smaller than 15 mm.

In FIG. 5, an arrow W3 indicates a width of the third slit 50. It is preferable that the width W3 should be equal to or greater than 0.5 mm and be equal to or smaller than 3.0 mm. The tire 2 including the third slit 50 having the width W3 which is equal to or greater than 0.5 mm has a small weight and is excellent in the ride comfort. From this viewpoint, it is particularly preferable that the width W3 should be equal to or greater than 1.0 mm. The rim protector 20 including the third slit 50 having the width W3 which is equal to or smaller than 3.0 mm is excellent in the strength. From this viewpoint, it is particularly preferable that the width W3 should be equal to or smaller than 2.0 mm.

In respect of the small weight and ride comfort of the tire 2 and the strength of the rim protector 20, it is preferable that the height H of the block 44 should be greater than the width W1 of the first slit 46, be greater than the width W2 of the second slit 48 and be greater than the width W3 of the third slit 50. A ratio (H/W1) is preferably equal to or higher than 2.0 and is particularly preferably equal to or higher than 5.0. It is preferable that the ratio (H/W1) should be equal to or lower than 30.0. A ratio (H/W2) is preferably equal to or higher than 2.0 and is particularly preferably equal to or higher than 5.0. It is preferable that the ratio (H/W2) should be equal to or lower than 30.0. A ratio (H/W3) is preferably equal to or higher than 2.0 and is particularly preferably equal to or higher than 5.0. It is preferable that the ratio (H/W3) should be equal to or lower than 30.0.

In respect of the small weight and ride comfort of the tire 2 and the strength of the rim protector 20, it is preferable that the width W3 of the third slit 50 should be greater than the width W1 of the first slit 46 and be greater than the width W2 of the second slit 48. A ratio (W3/W1) is preferably equal to or higher than 1.5 and is particularly preferably equal to or higher than 2.0. It is preferable that the ratio (W3/W1) should be equal to or lower than 10.0. A ratio (W3/W2) is preferably equal to or higher than 1.5 and is particularly preferably equal to or higher than 2.0. It is preferable that the ratio (W3/W2) should be equal to or lower than 10.0.

It is preferable that the number of the blocks 44 in the single rim protector 20 should be equal to or greater than 30 and be equal to or smaller than 300. The tire 2 including the rim protector 20 having the number which is equal to or greater than 30 has a small weight and is excellent in the ride comfort. From this viewpoint, it is particularly preferable that the number should be equal to or greater than 50. The rim protector 20 having the number which is equal to or smaller than 300 is excellent in the strength. From this viewpoint, it is particularly preferable that the number should be equal to or smaller than 200.

In the present invention, the dimension and the angle in each member of the tire 2 are measured in a state in which the tire 2 is incorporated in a normal rim and is filled with air to obtain a normal internal pressure. During the measurement, a load is not applied to the tire 2. In this specification, the normal rim implies a rim determined in rules on which the tire 2 depends. A "standard rim" in the JATMA rules, a "Design Rim" in the TRA rules and a "Measuring Rim" in the ETRTO rules are included in the normal rim. In this specification, the normal internal pressure implies an internal pressure determined in the rules on which the tire 2 depends. A "maximum air pressure" in the JATMA rules, a "maximum value" described in "TIRE LOAD LIMITS AT VARIOUS COLD INFLATION PRESSURES" in the TRA rules and an "INFLATION PRESSURE" in the ETRTO rules are included in the normal internal pressure. In case of the tire 2 for a passenger car, the dimension and the angle are measured in a state in which an internal pressure is 180 kPa.

Figure 6:
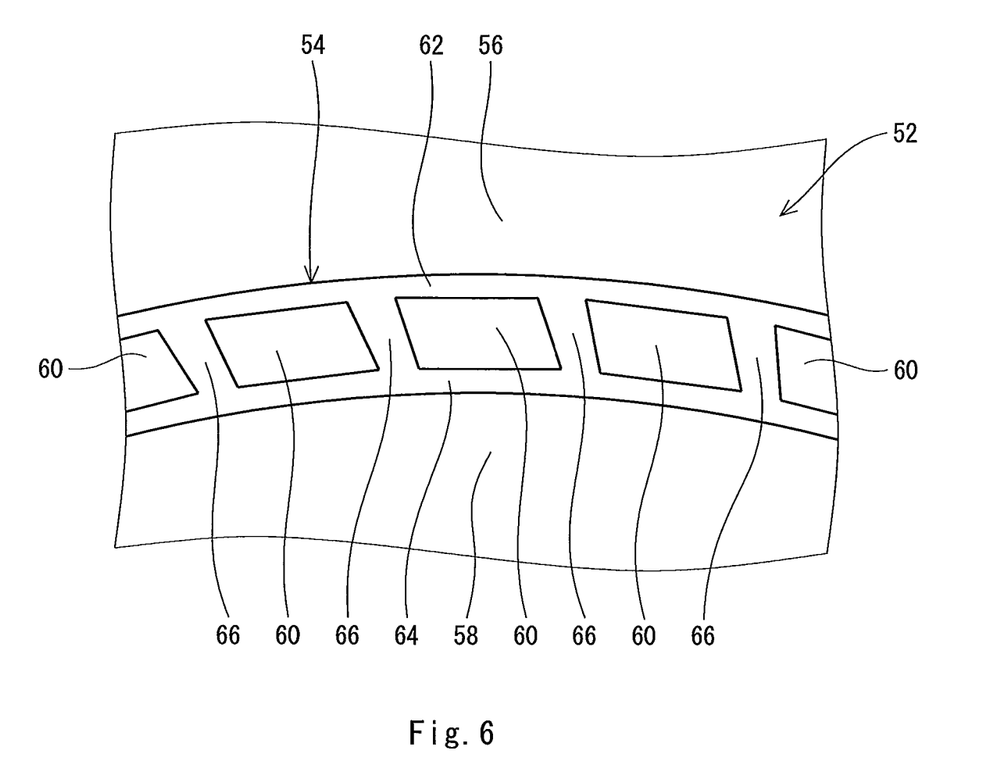
FIG. 6 is a front view showing a part of a pneumatic tire according to another embodiment of the present invention.

FIG. 6 shows a pneumatic tire according to another embodiment of the present invention. FIG. 6 shows the vicinity of a rim protector 52. Structures of members other than the rim protector 52 in the tire are equivalent to those of the tire 2 shown in FIGS. 1 to 5.

The rim protector 52 includes a main portion 54, an outer portion 56 and an inner portion 58. The main portion 54 has a large number of blocks 60, a first slit 62, a second slit 64 and a large number of third slits 66. The blocks 60 are arranged in a circumferential direction. Each of the blocks 60 generally takes a prismatic shape. The block 60 is a parallelogram as seen from a front part.

A width, a length and a height of the block 60, a width of the first slit 62, a width of the second slit 64 and a width of the third slit 66 are equal to those of the tire shown in FIGS. 1 to 5.

In the tire, a small weight can be achieved by the large number of slits 62, 64 and 66. The slits 62, 64 and 66 also contribute to a heat radiation. Each of the blocks 60 is surrounded by the first slit 62, the second slit 64 and two of the third slits 66. Therefore, the rim protector 52 can prevent a ride comfort of the tire from being inhibited.

Figure 7:
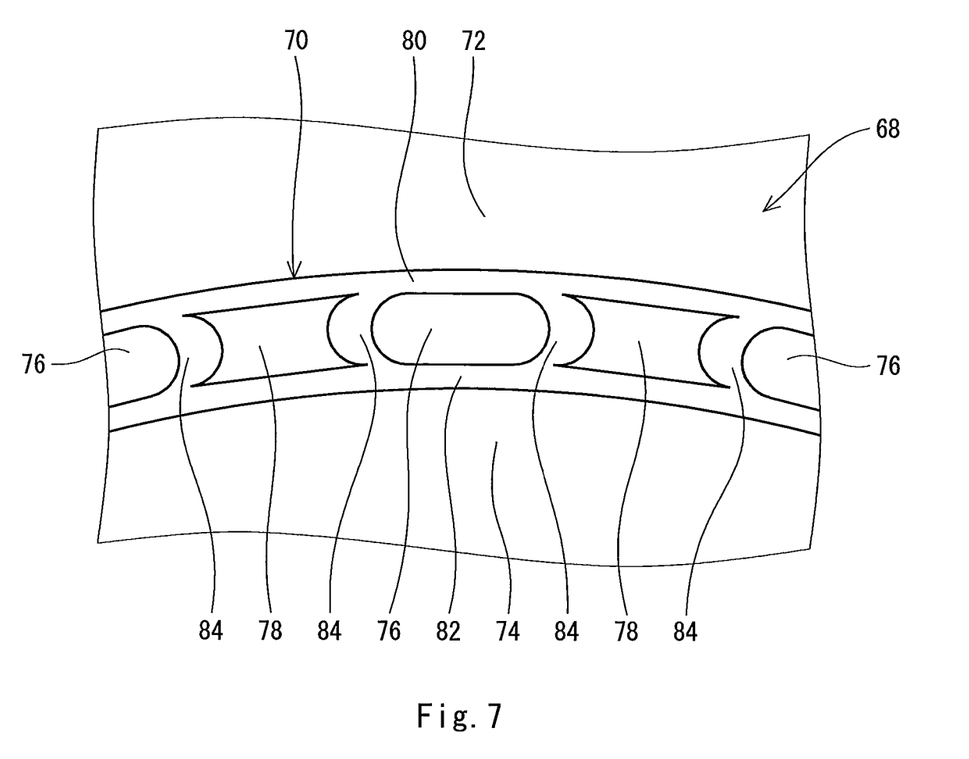
FIG. 7 is a front view showing a part of a pneumatic tire according to yet another embodiment of the present invention.

FIG. 7 shows a pneumatic tire according to yet another embodiment of the present invention. FIG. 7 shows the vicinity of a rim protector 68. Structures of members other than the rim protector 68 in the tire are equivalent to those of the tire 2 shown in FIGS. 1 to 5.

The rim protector 68 includes a main portion 70, an outer portion 72 and an inner portion 74. The main portion 70 has a large number of first blocks 76, a large number of second blocks 78, a first slit 80, a second slit 82 and a large number of third slits 84. The first block 76 and the second block 78 are alternately disposed in a circumferential direction. Each of the first blocks 76 is an ellipse as seen from a front part. Each of the second blocks 78 has an inward convex contour as seen from the front part.

A width, a length and a height of the first block 76 and a weight, a length and a height of the second block 78 are equal to those of the block 44 shown in FIGS. 1 to 5. A width of the first slit 80, a width of the second slit 82 and a width of the third slit 84 are equal to those of the tire 2 shown in FIGS. 1 to 5.

In the tire, a small weight can be achieved by the large number of slits 80, 82 and 84. The slits 80, 82 and 84 also contribute to a heat radiation. Each of the blocks is surrounded by the first slit 80, the second slit 82 and two of the third slits 84. Therefore, the rim protector 68 can prevent a ride comfort of the tire from being inhibited.

The rim protector 68 may include a block taking a shape of a circle, a fan, a triangle or a trapezoid as seen from a front part.

Figure 8:
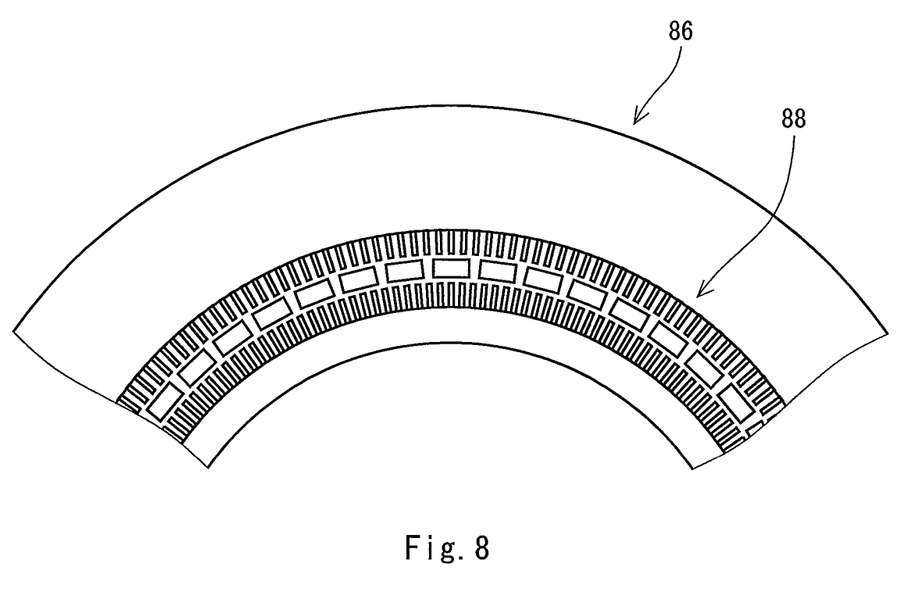
FIG. 8 is a front view showing a part of a pneumatic tire according to a further embodiment of the present invention.
Figure 9:
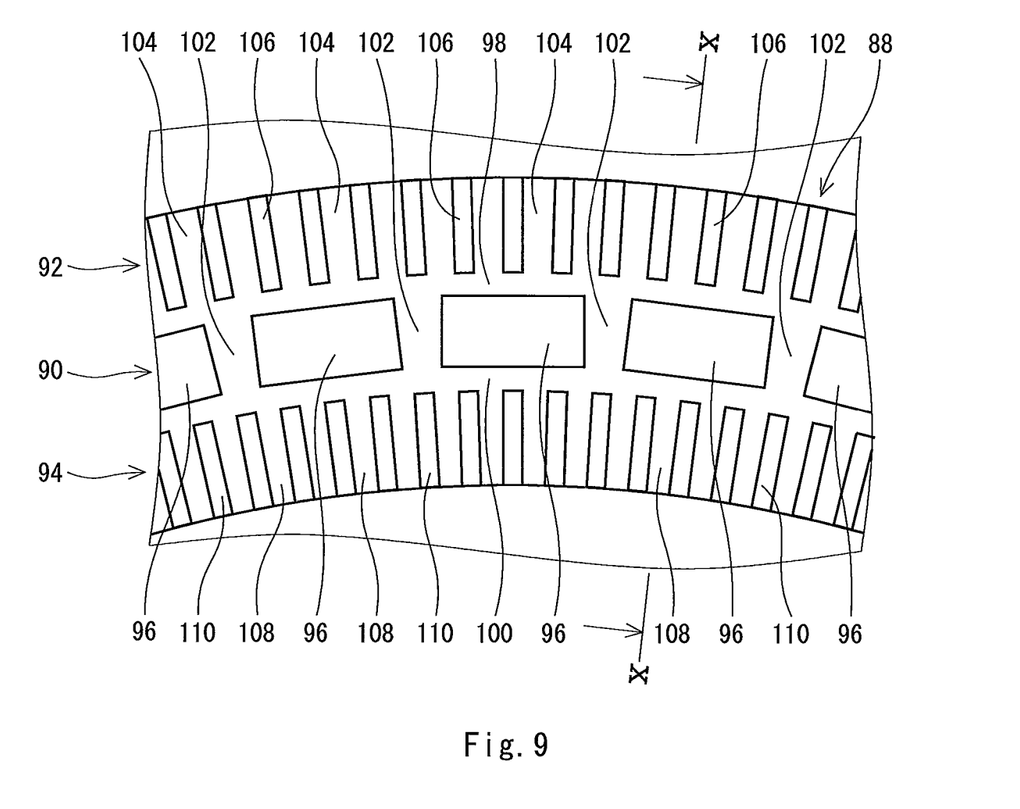
FIG. 9 is an enlarged front view showing a part of the tire in FIG. 8.
Figure 10:
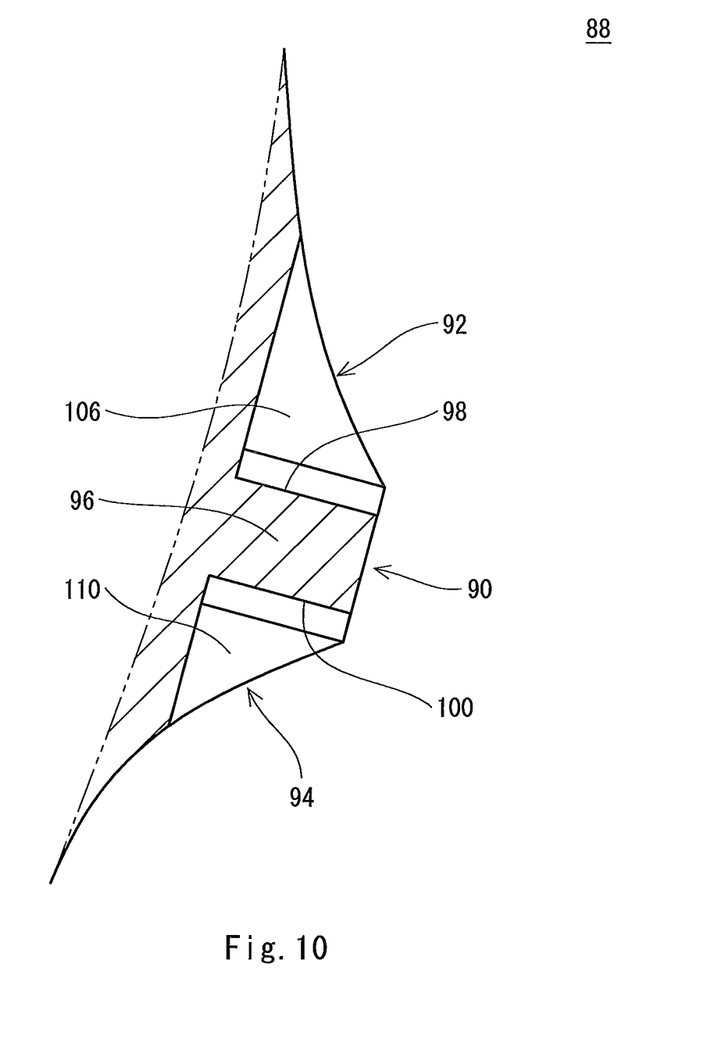
FIG. 10 is an enlarged sectional view taken along an X-X line in FIG. 9.

FIGS. 8 to 10 show a pneumatic tire 86 according to a further embodiment of the present invention. The tire 86 includes a rim protector 88. Structures of members other than the rim protector 88 in the tire 86 are equivalent to those of the tire 2 shown in FIGS. 1 to 5.

The rim protector 88 includes a main portion 90, an outer portion 92 and an inner portion 94. The main portion 90 has a large number of blocks 96, a first slit 98, a second slit 100 and a large number of third slits 102. The structure of the main portion 90 is equivalent to that of the main portion 34 shown in FIGS. 3 to 5.

As shown in FIGS. 9 and 10, the outer portion 92 has a large number of fourth slits 104 and a large number of first plates 106. The fourth slit 104 and the first plate 106 are alternately disposed in a circumferential direction. Each of the fourth slits 104 is extended in a radial direction. The fourth slit 104 is linked to the first slit 98. The first plate 106 is extended in the radial direction. As is apparent from FIG. 10, a height of the first plate 106 is gradually decreased outward in the radial direction. A maximum height of the first plate 106 is equal to a height of the block 96.

The inner portion 94 has a large number of fifth slits 108 and a large number of second plates 110. The fifth slit 108 and the second plate 110 are alternately disposed in the circumferential direction. Each of the fifth slits 108 is extended in the radial direction. The fifth slit 108 is linked to the second slit 100. The second plate 110 is extended in the radial direction. As is apparent from FIG. 10, a height of the second plate 110 is gradually decreased inward in the radial direction. A maximum height of the second plate 110 is equal to the height of the block 96.

By the fourth slit 104 and the fifth slit 108, a small weight of the tire 86 can be achieved. The slits 104 and 108 also contribute to a heat radiation. A vertical stiffness of the tire 86 having the slits 104 and 108 is not excessively great. The tire 86 is excellent in a ride comfort.

In respect of the ride comfort, the small weight of the tire 86 and a strength of the rim protector 88, it is preferable that a width of the fourth slit 104 should be equal to or greater than 0.5 mm and be equal to or smaller than 3.0 mm. In respect of the ride comfort, the small weight of the tire 86 and the strength of the rim protector 88, it is preferable that a width of the fifth slit 108 should be equal to or greater than 0.5 mm and be equal to or smaller than 3.0 mm.

The tire may include a rim protector having the slit 104 in the outer portion 92 and no slit 108 in the inner portion 94. The tire may include a rim protector having the slit 108 in the inner portion 94 and no slit 104 in the outer portion 92.

EXAMPLES

Example 1

There was fabricated a tire for a passenger car having the structure shown in FIGS. 1 to 5. The tire has a size of "245/40R18". A specification of a rim protector in the tire is as follows.

Length L of block: 10.0 mm
Width W of block: 6.0 mm
Height H of block: 10.0 mm
Width W1 of first slit: 1.0 mm
Width W2 of second slit: 1.0 mm
Width W3 of third slit: 1.0 mm

Examples 2 and 3

A tire according to each of examples 2 and 3 was obtained in the same manner as in the example 1 except that a width W3 of a third slit was set as shown in the following Table 1.

Examples 4 to 6

A tire according to each of examples 4 to 6 was obtained in the same manner as in the example 1 except that a width W of a block, a width W1 of a first slit and a width W2 of a second slit were set as shown in the following Table 1.

Examples 7 to 9

A tire according to each of examples 7 to 9 was obtained in the same manner as in the example 1 except that a height H of a block was set as shown in the following Table 2.

Examples 10 and 11

A tire according to each of examples 10 and 11 was obtained in the same manner as in the example 1 except that a length L of a block was set as shown in the following Table 2.

Comparative Example 1

A tire according to a comparative example 1 was obtained in the same manner as in the example 1 except that a slit was not formed on a rim protector.

Comparative Example 2

A tire according to a comparative example 2 was obtained in the same manner as in the example 1 except that a rim protector was not provided.

[Weight]
A weight of the tire was measured. The result is shown as an index in the following Tables 1 and 2. A smaller value is preferable.

[Ride Comfort]
A tire was incorporated in a normal rim and was filled with air to obtain an internal pressure of 230 kPa. The tire was attached to a passenger car having a displacement of 4300 cc. A driver was caused to drive the passenger car over a racing circuit and to evaluate a ride comfort. The result is shown as an index in the following Tables 1 and 2. A greater numeric value is preferable.

[Damage Test]
A tire was incorporated in a normal rim and was filled with air to obtain an internal pressure of 230 kPa. The tire was attached to a passenger car having a displacement of 4300 cc. A square timber was put on a road surface and the passenger car was caused to get over the square timber through a left front wheel. The following conditions were set.

Material of square timber: steel
Height of square timber: 110 mm
Width of square timber: 125 mm
Length of square timber: 930 mm
Angle in running direction with respect to square timber: 15°
Speed of vehicle: 10 km/h and 20 km/h An extent of a damage of a rim flange was visually confirmed and grading was made on the following basis.

| | |
|---|---|
| A: | No damage |
| B: | Small damage |
| C: | Large damage |

The result is shown in the following Tables 1 and 2.

[Appearance]

An appearance of a tire was observed and grading was made on the following basis.

| | |
|---|---|
| A: | Excellent |
| B: | Slightly excellent |
| C: | Ordinary |

The result is shown in the following Tables 1 and 2.

TABLE 1

Result of evaluation

| | Example 1 | Example 2 | Example 3 | Example 4 | Example 5 | Example 6 |
|---|---|---|---|---|---|---|
| Rim protector | Yes | Yes | Yes | Yes | Yes | Yes |
| Length of block L (mm) | 10.0 | 10.0 | 10.0 | 10.0 | 10.0 | 10.0 |
| Width of block W (mm) | 6.0 | 6.0 | 6.0 | 4.0 | 2.0 | 1.0 |
| Height of block H (mm) | 10.0 | 10.0 | 10.0 | 10.0 | 10.0 | 10.0 |
| Width of first slit W1 (mm) | 1.0 | 1.0 | 1.0 | 2.0 | 3.0 | 3.5 |
| Width of second slit W2 (mm) | 1.0 | 1.0 | 1.0 | 2.0 | 3.0 | 3.5 |
| Width of third slit W3 (mm) | 1.0 | 2.0 | 3.0 | 1.0 | 1.0 | 1.0 |
| Weight of tire (index) | 99.7 | 99.6 | 99.5 | 99.4 | 99.2 | 99.1 |
| Ride comfort | 7.0 | 6.5 | 6.5 | 7.0 | 7.0 | 7.0 |
| Damage test (speed: 10 km/h) | A | A | A | A | A | A |
| Damage test (speed: 20 km/h) | A | A | A | A | B | C |
| Appearance | A | A | B | A | B | B |

TABLE 2

Result of evaluation

| | Example 7 | Example 8 | Example 9 | Example 10 | Example 11 | Compara. Example 1 | Compara. Example 2 |
|---|---|---|---|---|---|---|---|
| Rim protector | Yes | Yes | Yes | Yes | Yes | Yes | No |
| Length of block L (mm) | 10.0 | 10.0 | 10.0 | 6.0 | 2.0 | — | — |
| Width of block W (mm) | 6.0 | 6.0 | 6.0 | 6.0 | 6.0 | — | — |
| Height of block H (mm) | 5.0 | 2.0 | 1.0 | 10.0 | 10.0 | — | — |
| Width of first slit W1 (mm) | 1.0 | 1.0 | 1.0 | 1.0 | 1.0 | — | — |
| Width of second slit W2 (mm) | 1.0 | 1.0 | 1.0 | 1.0 | 1.0 | — | — |
| Width of third slit W3 (mm) | 1.0 | 1.0 | 1.0 | 1.0 | 1.0 | — | — |
| Weight of tire (index) | 99.8 | 99.9 | 100.0 | 99.8 | 99.9 | 100 | 92 |
| Ride comfort | 6.5 | 6.0 | 6.0 | 7.0 | 7.0 | 6.0 | 7.0 |
| Damage test (speed: 10 km/h) | A | A | A | A | A | A | B |
| Damage test (speed: 20 km/h) | A | A | A | A | A | A | C |
| Appearance | A | A | B | A | A | C | C |

As shown in the Tables 1 and 2, the tires according to the examples are excellent in various performances. From the result of the evaluation, the advantage of the present invention is apparent.

The tire according to the present invention can be attached to various vehicles. The above description is only illustrative and various changes can be made without departing from the scope of the present invention.

What is claimed is:

1. A pneumatic tire comprising a tread having an external surface forming a tread surface, a pair of sidewalls extended almost inward in a radial direction from an end of the tread respectively, a pair of beads positioned on an almost inside in the radial direction with respect to the sidewalls respectively, a carcass laid between one of the beads and the other bead along an inside of the tread and the sidewall, and a rim protector positioned on an outside in an axial direction of the sidewall, wherein the rim protector has a large number of blocks arranged in a circumferential direction, the rim protector has a first slit and a second slit which are extended in the circumferential direction, and a large number of third slits extended in the radial direction, each of the blocks is surrounded by the first slit, the second slit and two of the third slits, the rim protector has a main portion, an outer portion extended outward in the radial direction from the main portion, and an inner portion extended inward in the radial direction from the main portion, the large number of blocks are formed in the main portion, and the outer portion has a large number of slits and a large number of plates, and the slits and the plates are disposed alternately in the circumferential direction.

2. A pneumatic tire comprising a tread having an external surface forming a tread surface, a pair of sidewalls extended almost inward in a radial direction from an end of the tread respectively, a pair of beads positioned on an almost inside in the radial direction with respect to the sidewalls respectively, a carcass laid between one of the beads and the other bead along an inside of the tread and the sidewall, and a rim protector positioned on an outside in an axial direction of the sidewall, wherein
- the rim protector has a large number of blocks arranged in a circumferential direction,
- the rim protector has a first slit and a second slit which are extended in the circumferential direction, and a large number of third slits extended in the radial direction,
- each of the blocks is surrounded by the first slit, the second slit and two of the third slits,
- the rim protector has a main portion, an outer portion extended outward in the radial direction from the main portion, and an inner portion extended inward in the radial direction from the main portion,
- the large number of blocks are formed in the main portion, and
- the inner portion has a large number of slits and a large number of plates, and the slits and the plates are disposed alternately in the circumferential direction.

* * * * *